United States Patent
Jalali et al.

(10) Patent No.: US 9,614,608 B2
(45) Date of Patent: Apr. 4, 2017

(54) ANTENNA BEAM MANAGEMENT AND GATEWAY DESIGN FOR BROADBAND ACCESS USING UNMANNED AERIAL VEHICLE (UAV) PLATFORMS

(71) Applicant: Ubiqomm LLC, San Diego, CA (US)

(72) Inventors: Ahmad Jalali, San Diego, CA (US); Dhinakar Radhakrishnan, San Diego, CA (US)

(73) Assignee: Ubiqomm LLC, San Diego, CA (US)

( * ) Notice: Subject to any disclaimer, the term of this patent is extended or adjusted under 35 U.S.C. 154(b) by 23 days.

(21) Appl. No.: 14/486,916

(22) Filed: Sep. 15, 2014

(65) Prior Publication Data

US 2016/0013858 A1    Jan. 14, 2016

Related U.S. Application Data

(60) Provisional application No. 62/024,421, filed on Jul. 14, 2014.

(51) Int. Cl.

| | | |
|---|---|---|
| H04B 7/185 | (2006.01) | |
| H01Q 25/00 | (2006.01) | |
| H04B 7/06 | (2006.01) | |
| H04B 7/204 | (2006.01) | |
| H04W 16/28 | (2009.01) | |
| H04W 40/06 | (2009.01) | |
| H01Q 1/28 | (2006.01) | |
| H04W 84/06 | (2009.01) | |

(52) U.S. Cl.
CPC ........... *H04B 7/18504* (2013.01); *H01Q 1/28* (2013.01); *H01Q 25/00* (2013.01); *H04B 7/0617* (2013.01); *H04B 7/2041* (2013.01); *H04W 16/28* (2013.01); *H04W 40/06* (2013.01); *H04W 84/06* (2013.01)

(58) Field of Classification Search
None
See application file for complete search history.

(56) References Cited

U.S. PATENT DOCUMENTS

| | | |
|---|---|---|
| 3,780,303 A | 12/1973 | Smith et al. |
| 4,209,695 A | 6/1980 | Arnold et al. |

(Continued)

FOREIGN PATENT DOCUMENTS

| | | |
|---|---|---|
| CA | 2316440 A1 | 2/2001 |
| EP | 2369361 A1 | 9/2011 |

(Continued)

OTHER PUBLICATIONS

Goldsmith AJ., et al., "Design Challenges for Energy-Constrained Ad Hoc Wireless Networks," Wireless Communications, IEEE, 2002, vol. 9 (4), pp. 8-27.

*Primary Examiner* — Anh-Vu Ly
(74) *Attorney, Agent, or Firm* — Gazdzinski & Associates, PC

(57) ABSTRACT

Systems and methods for creating beams from a non-terrestrial vehicle (e.g., unmanned aerial vehicle (UAV)) toward user terminals and gateways on the ground. Another aspect of the disclosure includes systems and methods for switching the UAV beams toward the user terminals and gateways as the UAV moves in its orbit. Still another aspect of the disclosure describes systems and methods for routing traffic from user terminals to the internet via multiple gateways.

20 Claims, 6 Drawing Sheets

High level block diagram of traffic routing through multiple gateways.

(56) References Cited

U.S. PATENT DOCUMENTS

| | | | |
|---|---|---|---|
| 4,278,885 A | 7/1981 | Von Alfthan et al. | |
| 4,317,993 A | 3/1982 | Hertzog, Jr. et al. | |
| 4,365,154 A | 12/1982 | Arnold et al. | |
| 4,387,302 A | 6/1983 | Givens | |
| 4,499,380 A | 2/1985 | Aggour et al. | |
| 4,851,687 A | 7/1989 | Ettinger et al. | |
| 5,021,664 A | 6/1991 | Hinshaw | |
| 5,068,532 A | 11/1991 | Wormald et al. | |
| 5,076,993 A | 12/1991 | Sawa et al. | |
| 5,098,640 A | 3/1992 | Gozani et al. | |
| 5,239,568 A | 8/1993 | Grenier | |
| 5,521,817 A | 5/1996 | Burdoin et al. | |
| 5,712,885 A | 1/1998 | Sowerby et al. | |
| 5,832,379 A * | 11/1998 | Mallinckrodt | H04B 7/18558 455/12.1 |
| 6,018,659 A | 1/2000 | Ayyagari et al. | |
| 6,034,634 A | 3/2000 | Karlsson et al. | |
| 6,044,323 A | 3/2000 | Yee et al. | |
| 6,061,562 A * | 5/2000 | Martin | H01Q 3/242 455/427 |
| 6,108,538 A | 8/2000 | Blasiak et al. | |
| 6,144,032 A | 11/2000 | Gazdzinski | |
| 6,256,476 B1 | 7/2001 | Beamish et al. | |
| 6,513,758 B1 | 2/2003 | Lloyd | |
| 6,628,941 B2 * | 9/2003 | Knoblach | H04B 7/18576 455/431 |
| 6,718,161 B1 | 4/2004 | Westall et al. | |
| 6,756,937 B1 | 6/2004 | Chang et al. | |
| 6,856,803 B1 | 2/2005 | Gross et al. | |
| 7,095,376 B1 | 8/2006 | Timothy et al. | |
| 7,212,170 B1 | 5/2007 | Dean et al | |
| 7,777,674 B1 | 8/2010 | Haddadin et al. | |
| 8,078,162 B2 * | 12/2011 | Deaton | H04B 7/18506 455/404.1 |
| 8,116,763 B1 * | 2/2012 | Olsen | H04W 16/28 455/422.1 |
| 8,183,999 B1 | 5/2012 | Giallorenzi | |
| 8,190,147 B2 * | 5/2012 | Kauffman | H04L 45/42 370/316 |
| 8,558,734 B1 | 10/2013 | Piesinger | |
| 8,897,770 B1 | 11/2014 | Frolov et al. | |
| 9,100,086 B1 * | 8/2015 | Olsen | H04B 7/18504 455/422.1 |
| 9,119,177 B2 | 8/2015 | Eguchi | |
| 2002/0061730 A1 | 5/2002 | Hart et al. | |
| 2002/0168974 A1 | 11/2002 | Rosen et al. | |
| 2003/0040274 A1 | 2/2003 | Dai et al. | |
| 2003/0095067 A1 | 5/2003 | Howell | |
| 2003/0223354 A1 | 12/2003 | Olszewski | |
| 2004/0038658 A1 | 2/2004 | Gurelli et al. | |
| 2004/0152480 A1 | 8/2004 | Willars et al. | |
| 2005/0035897 A1 | 2/2005 | Perl | |
| 2005/0143005 A1 | 6/2005 | Moore | |
| 2005/0243005 A1 | 11/2005 | Rafi et al. | |
| 2005/0264438 A1 | 12/2005 | Fullerton et al. | |
| 2006/0009262 A1 | 1/2006 | Hamm | |
| 2006/0063566 A1 * | 3/2006 | Maruta | H04B 7/086 455/562.1 |
| 2006/0238411 A1 | 10/2006 | Fullerton et al. | |
| 2007/0090990 A1 | 4/2007 | Nelson | |
| 2007/0184849 A1 | 8/2007 | Zheng | |
| 2007/0230419 A1 | 10/2007 | Raman et al. | |
| 2008/0090606 A1 | 4/2008 | Hwang et al. | |
| 2008/0233865 A1 | 9/2008 | Malarky et al. | |
| 2009/0092072 A1 | 4/2009 | Imamura et al. | |
| 2009/0209277 A1 | 8/2009 | Pinchas et al. | |
| 2009/0219912 A1 | 9/2009 | Wengerter et al. | |
| 2010/0085236 A1 | 4/2010 | Franceschini et al. | |
| 2010/0172299 A1 | 7/2010 | Fischer et al. | |
| 2010/0224732 A1 | 9/2010 | Olson et al. | |
| 2010/0273504 A1 | 10/2010 | Bull et al. | |
| 2010/0284377 A1 | 11/2010 | Wei et al. | |
| 2010/0290412 A1 | 11/2010 | Ahn et al. | |
| 2011/0032149 A1 | 2/2011 | Leabman | |
| 2011/0103293 A1 | 5/2011 | Gale et al. | |
| 2011/0122024 A1 | 5/2011 | Eidloth et al. | |
| 2011/0142150 A1 | 6/2011 | Anigstein et al. | |
| 2011/0182230 A1 * | 7/2011 | Ohm | H04B 7/185 370/315 |
| 2011/0286325 A1 | 11/2011 | Jalali et al. | |
| 2011/0286372 A1 | 11/2011 | Taghavi Nasrabadi et al. | |
| 2012/0052828 A1 | 3/2012 | Kamel et al. | |
| 2012/0202430 A1 | 8/2012 | Jalali et al. | |
| 2012/0235863 A1 | 9/2012 | Erdos et al. | |
| 2013/0070677 A1 * | 3/2013 | Chang | G01S 13/9303 370/328 |
| 2013/0109299 A1 * | 5/2013 | Roos | H04B 7/18528 455/12.1 |
| 2013/0155847 A1 * | 6/2013 | Li | H04W 24/04 370/225 |
| 2013/0156021 A1 | 6/2013 | Ashikhmin et al. | |
| 2013/0303080 A1 | 11/2013 | Moreno | |
| 2013/0321204 A1 | 12/2013 | Zahavi et al. | |
| 2013/0331026 A1 * | 12/2013 | O—Neill | H04B 7/18515 455/12.1 |
| 2014/0003302 A1 | 1/2014 | Han et al. | |
| 2014/0003394 A1 | 1/2014 | Rubin et al. | |
| 2014/0049643 A1 | 2/2014 | Segerstrom et al. | |
| 2014/0073337 A1 | 3/2014 | Hong et al. | |
| 2014/0105054 A1 | 4/2014 | Sægrov et al. | |
| 2014/0139372 A1 | 5/2014 | Seol et al. | |
| 2014/0241239 A1 * | 8/2014 | Chang | H04B 7/18506 370/316 |
| 2014/0335817 A1 | 11/2014 | Hyde et al. | |
| 2014/0347223 A1 | 11/2014 | Hyde | |
| 2014/0348140 A1 | 11/2014 | Atkinson | |
| 2015/0142966 A1 | 5/2015 | Baran et al. | |
| 2015/0236778 A1 * | 8/2015 | Jalali | H04B 7/18504 370/316 |
| 2015/0236779 A1 * | 8/2015 | Jalali | H04W 16/28 342/367 |
| 2015/0236780 A1 | 8/2015 | Jalali | |
| 2015/0236781 A1 * | 8/2015 | Jalali | H04B 7/18504 370/252 |
| 2015/0237569 A1 * | 8/2015 | Jalali | H04B 7/18504 370/326 |
| 2015/0280812 A1 | 10/2015 | Jalali | |
| 2015/0304885 A1 * | 10/2015 | Jalali | H04W 28/048 370/329 |
| 2015/0362917 A1 | 12/2015 | Wang | |
| 2016/0088498 A1 | 3/2016 | Sharawi | |

FOREIGN PATENT DOCUMENTS

| | | |
|---|---|---|
| EP | 2801838 A1 | 11/2014 |
| WO | WO-2014007873 A2 | 1/2014 |

* cited by examiner

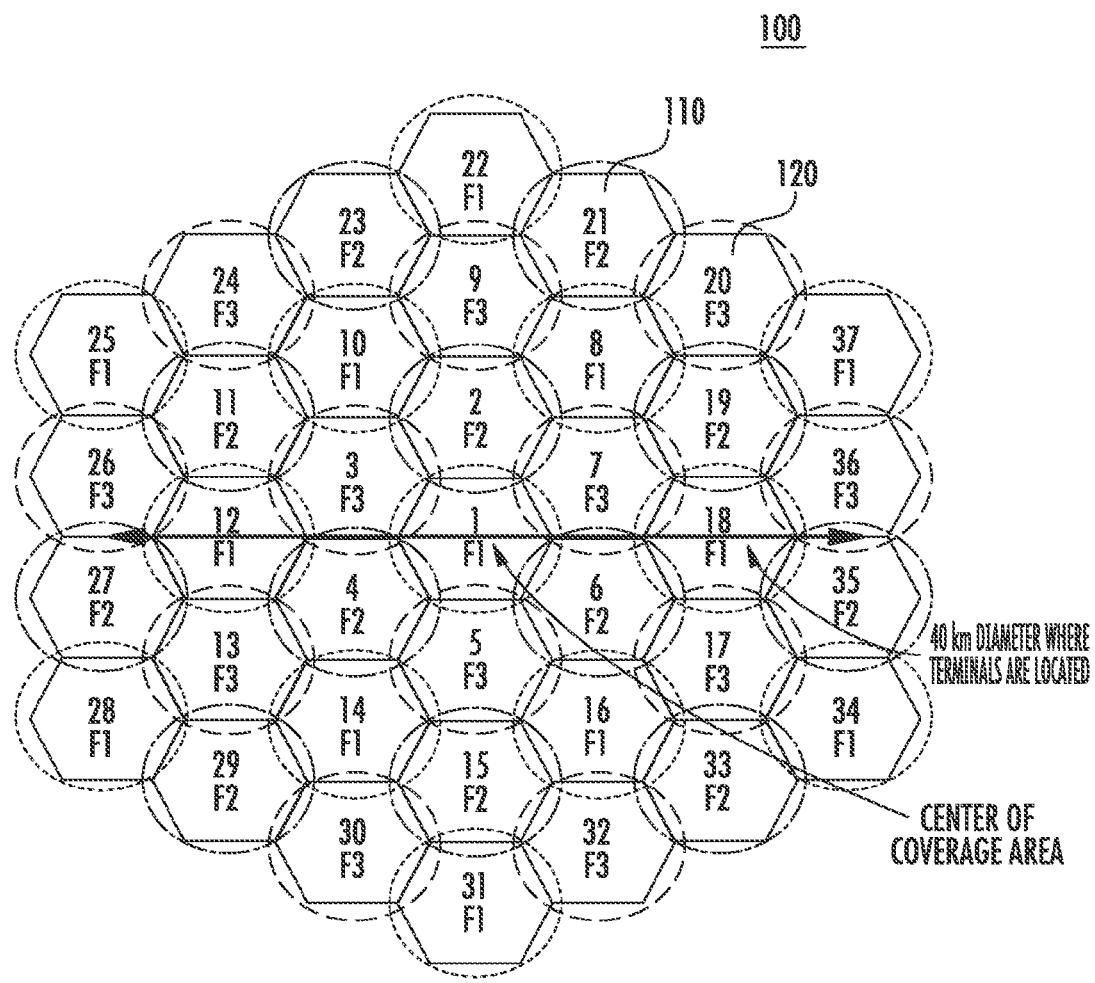
FIG. 1.1 Example 37 beams covering user terminals.

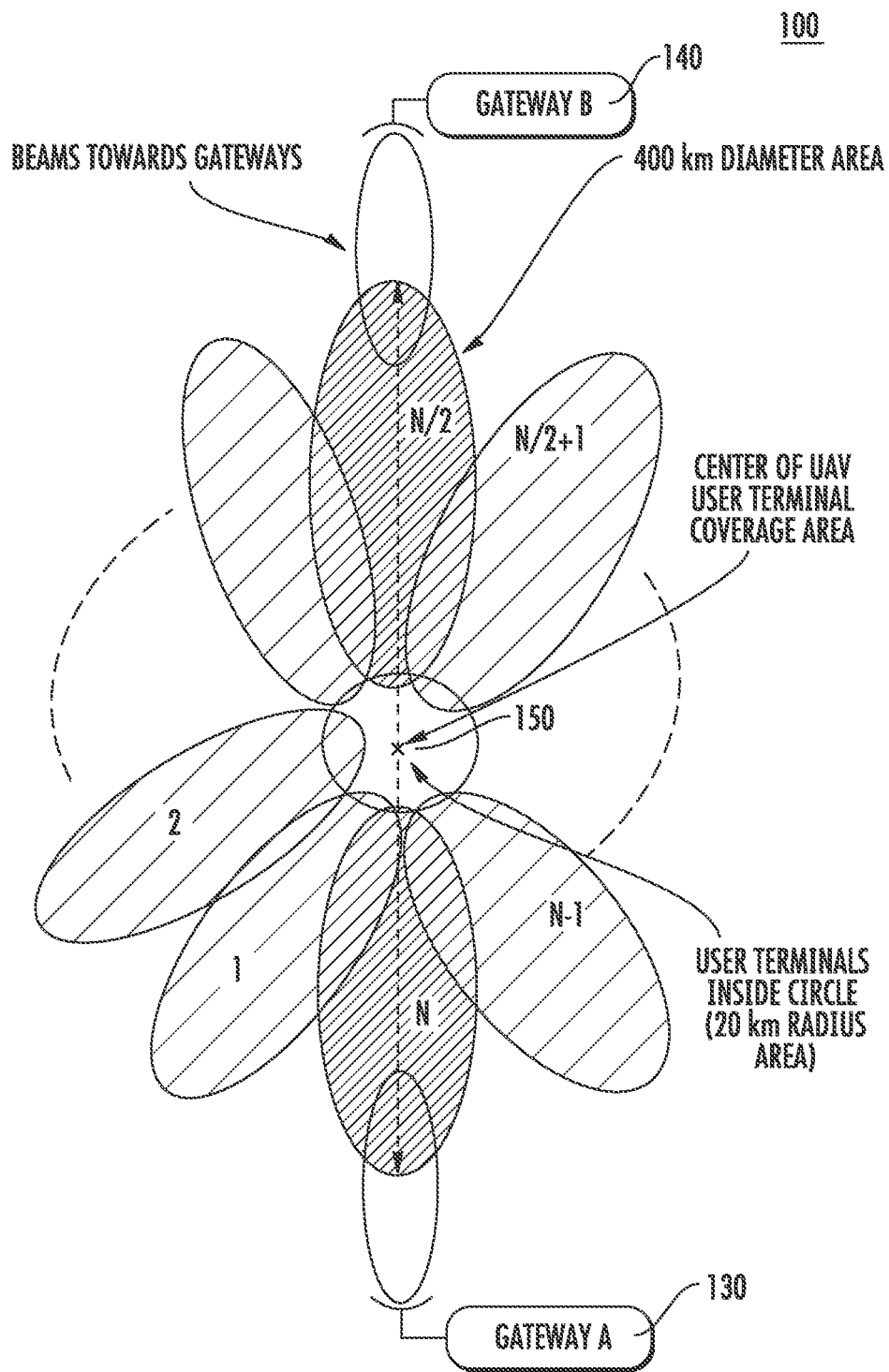
FIG. 1.2 Example of beams covering gateways.

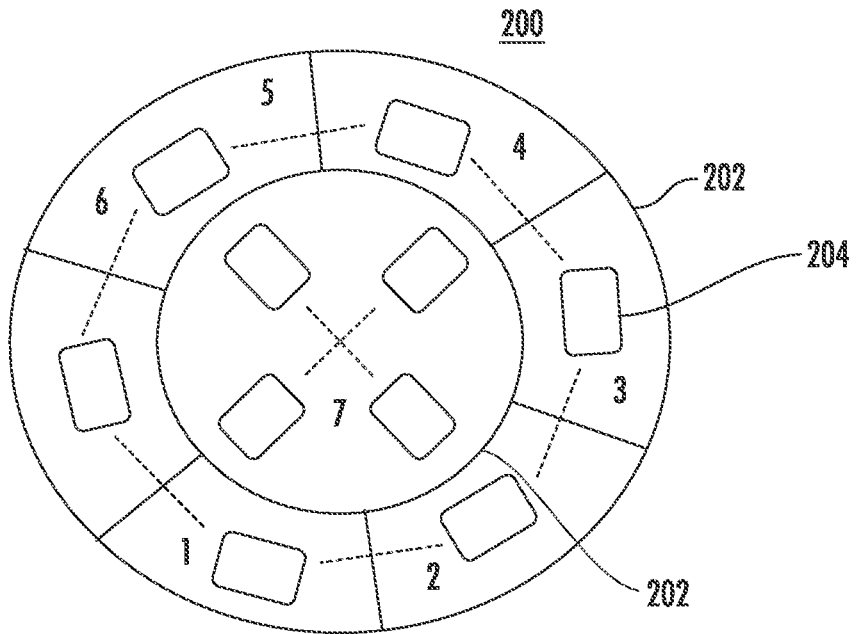
FIG. 2.1 UAV antenna fixture for forming beams to user terminals and gateways.
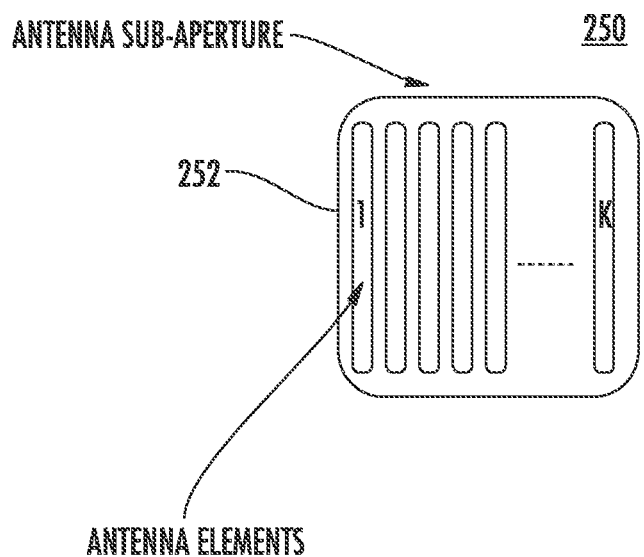
FIG. 2.2 Structure of one sub-aperture for UAV 28 GHz gateway antenna.

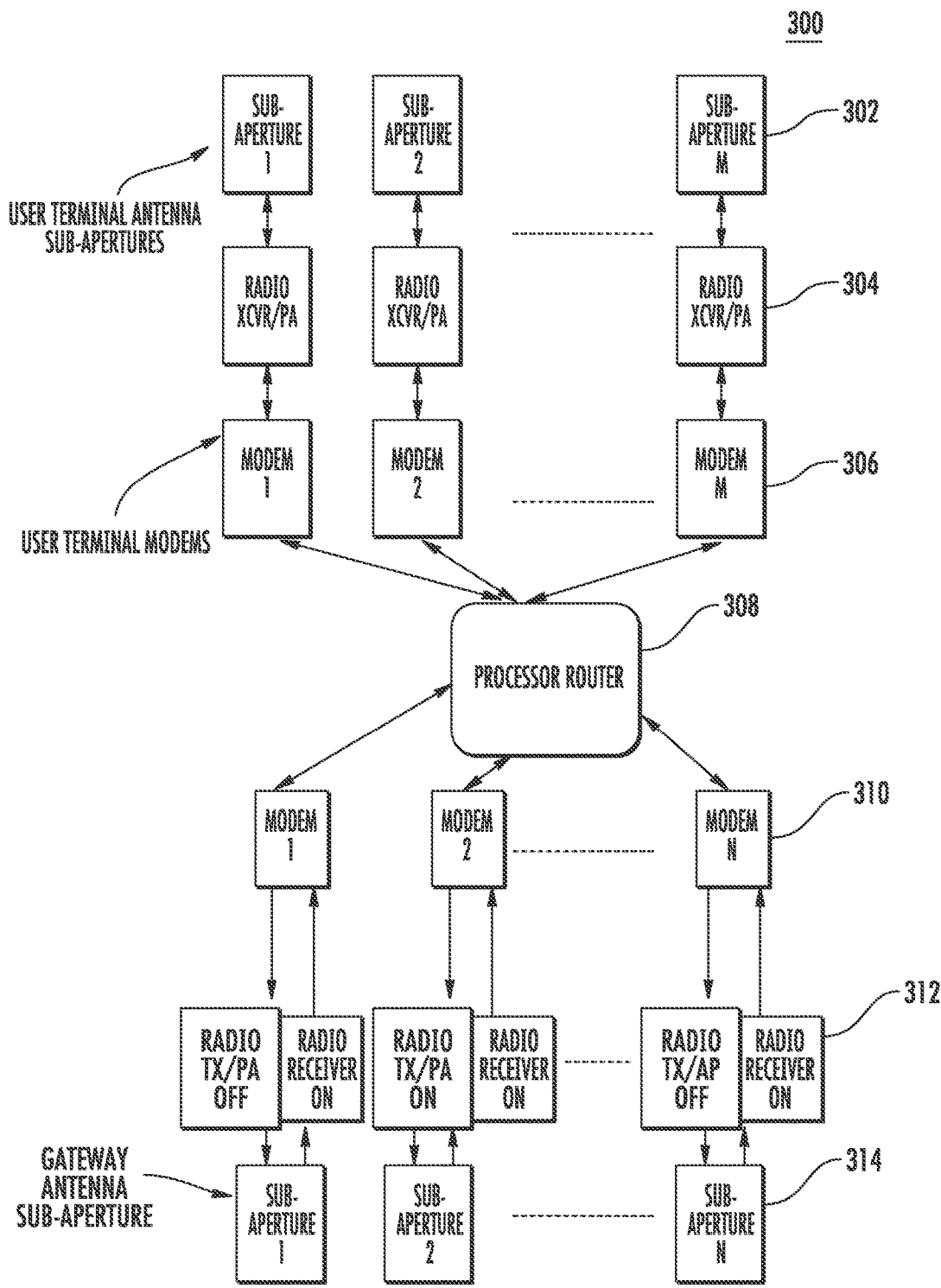
FIG. 3 *High level U AV hardware architecture.*

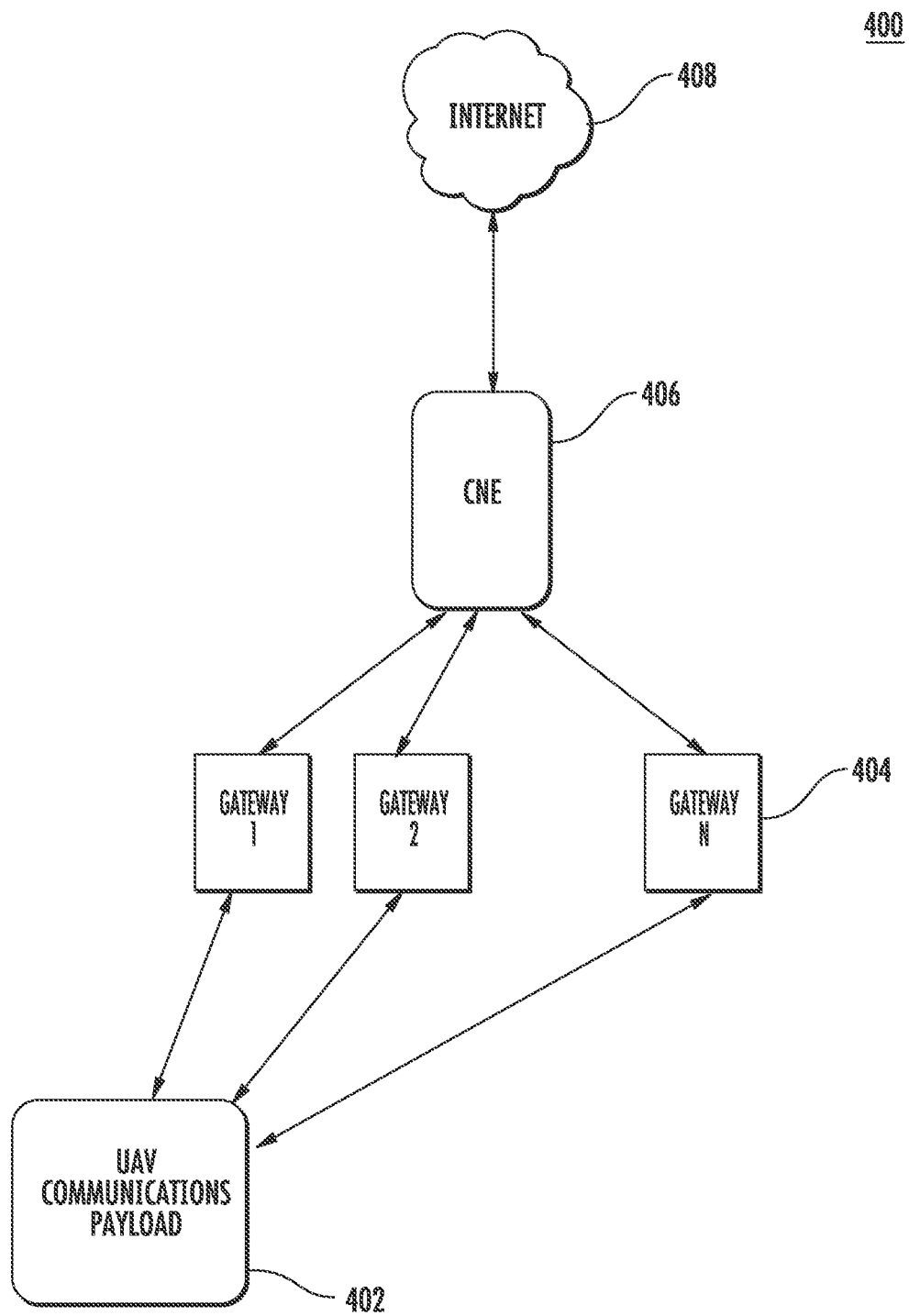
FIG. 4 High level block diagram of traffic routing through multiple gateways.

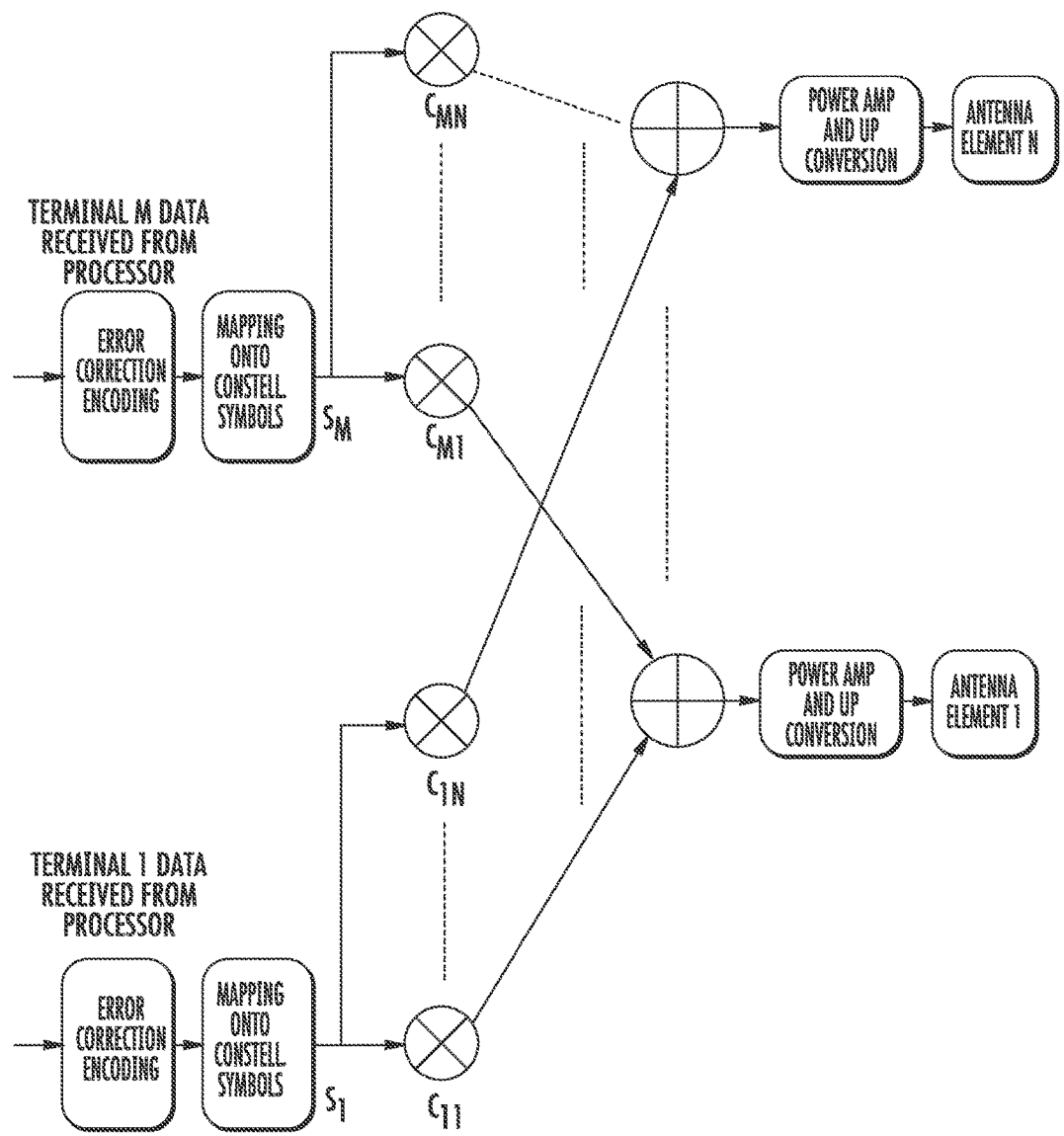
FIG. 5 Electronic beam forming circuitry.

ANTENNA BEAM MANAGEMENT AND GATEWAY DESIGN FOR BROADBAND ACCESS USING UNMANNED AERIAL VEHICLE (UAV) PLATFORMS

PRIORITY AND RELATED APPLICATIONS

This application claims priority to co-owned U.S. Provisional Patent Application Ser. No. 62/024,421 filed Jul. 14, 2014, and entitled "METHODS AND APPARATUS FOR MITIGATING FADING IN A BROADBAND ACCESS SYSTEM USING DRONE/UAV PLATFORMS", which is incorporated herein by reference in its entirety.

The application is also related to co-owned and co-pending U.S. patent application Ser. No. 14/295,160 filed on Jun. 3, 2014, and entitled "METHODS AND APPARATUS FOR MITIGATING FADING IN A BROADBAND ACCESS SYSTEM USING DRONE/UAV PLATFORMS"; co-owned and co-pending U.S. patent application Ser. No. 14/222,497 filed on Mar. 21, 2014, and entitled "BROADBAND ACCESS TO MOBILE PLATFORMS USING DRONE/UAV"; and co-owned and co-pending U.S. patent application Ser. No. 14/223,705 filed on Mar. 24, 2014, and entitled "BROADBAND ACCESS SYSTEM VIA DRONE/UAV PLATFORMS", each of the foregoing incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure describes, among other things, systems and methods for creating beams from an unmanned aerial vehicle (UAV) toward user terminals and gateways on the ground. Another aspect of the disclosure includes systems and methods for switching the UAV beams toward the user terminals and gateways as the UAV moves in its orbit. Still another aspect of the disclosure describes systems and methods for routing traffic from user terminals to the internet via multiple gateways.

2. Description of Related Technology

As internet traffic has increased, new technologies are needed to deliver broadband access to homes and enterprises at lower cost and to places that are not yet covered. Examples of current broadband delivery systems include terrestrial wired networks such as DSL (Digital Subscriber Line) on twisted pair, fiber delivery systems such as FiOS (Fiber Optic Service), and geo-stationary satellite systems. The current broadband access systems have a number of short comings. One issue is lack of service in remote and/or lightly populated areas. Geo-stationary satellites do provide service in remote areas of the developed world such as the United States. Poorer areas of the world, however, lack adequate satellite capacity.

A notable reason satellite capacity has not been adequately provided in poor regions of the world is the relatively high cost of satellite systems. Due to adverse atmospheric effects in satellite orbits, satellite hardware must be space qualified and is costly. Launch vehicles to put the satellites in orbit are also costly. Moreover, due to the launch risk and the high cost of satellites, there may be significant insurance costs for the satellite and the launch. Therefore, broadband satellite systems and services are relatively costly and difficult to justify, particularly in poorer regions of the world. It is also costly to deploy terrestrial systems such as fiber or microwave links in lightly populated regions. The small density of subscribers does not justify the deployment cost.

Despite the broad variety of ways for providing broadband access to consumers in the prior art, none achieve the desired level of flexibility and cost, particularly for consumers that reside in remote or sparsely populated geographic areas. Moreover, terrestrial based methods for providing broadband access to consumers do not provide the requisite flexibility for changing populations and densities. Accordingly, methods and apparatus are needed that provide the requisite level of desired flexibility and cost for providing broadband access to consumers.

SUMMARY

The present disclosure describes, inter alia, systems and methods for creating beams from an unmanned aerial vehicle (UAV) toward user terminals and gateways on the ground.

In a first aspect, a system for providing broadband access using unmanned aerial vehicles (UAVs) is disclosed. In one embodiment, the system includes a first antenna system includes multiple first antenna sub-apertures, where each first antenna sub-aperture is configured to form at least one first beam toward one or more user terminals; a second antenna system includes multiple second antenna sub-apertures, where each second antenna sub-aperture is configured to form at least one second beam toward one or more gateways of a set of ground gateways configured to provide connectivity to a core network; a first set of radio transceivers and modems configured to transmit and receive a plurality of first signals to/from the one or more user terminals; a second set of radio transceivers and modems configured to transmit and receive a plurality of second signals to/from the one or more gateways; and a router/processor sub-system configured to route packets between the one or more user terminals and the one or more gateways and to manage the at least one first and at least one second beams.

In one variant, the multiple second antenna sub-apertures include K antenna elements, each spaced at substantially a half wavelength apart from an adjacent antenna element. Each of the second antenna sub-apertures are configured to form M beams via one or more appropriate phases of the K antenna elements, and the router/processor sub-system selects one of the M beams based on a determined signal quality.

In an alternative variant, the router/processor sub-system is configured to: measure at least two signal to interference plus noise ratios (SINRs) from a received signal on a primary beam associated with a primary gateway and at least one other candidate beam; compare the at least two SINRs associated with the primary beam and the at least one other candidate beam; and determine when the primary beam should be switched to the at least one other candidate beam based at least in part on the comparison.

In yet another variant, the router/processor sub-system is configured to: execute a UAV beam switch request configured to cause at least one user terminal to be switched to a different beam.

In yet another variant, the router/processor sub-system is configured to: determine a minimum transmit power to achieve a target signal quality for a given beam; and adjust a power amplifier associated with the given beam to achieve the minimum transmit power.

In yet another variant, the target signal quality is indicative of a rain fade condition and the adjustment of the power amplifier includes increasing the transmit power in order to compensate for the rain fade condition.

In yet another variant, the router/processor sub-system is configured to: measure at least two signal to interference plus noise ratios (SINRs) from a received signal on a primary beam and at least one other neighbor beam; compare the at least two SINRs associated with the primary beam and the at least one other neighbor beam; and determine when the primary beam should be switched to a neighbor beam based at least in part on the comparison; and execute the beam switch from the primary beam to the neighbor beam.

In yet another variant, the router/processor sub-system is configured to: measure at least two signal to interference plus noise ratios (SINRs) from a received signal on a primary beam associated with a primary gateway and at least one inactive beam; compare the at least two SINRs associated with the primary beam and the at least one inactive beam; and determine when the primary beam should be switched to the at least one inactive beam based at least in part on the comparison.

In a second aspect, an antenna fixture for providing broadband access using UAVs is disclosed. In one embodiment, the antenna fixture includes a multi-faceted antenna structure having a plurality of apertures, each of the apertures further including a plurality of sub-apertures. Each sub-aperture is responsible for forming at least one beam.

In one variant, the multi-faceted antenna structure includes apertures that are placed at an angle with respect to a given aperture; the apertures that are placed at an angle are further configured to provide coverage to a location at the edge of a coverage area for the antenna fixture.

In yet another variant, the multi-faceted antenna structure is further configured to form at least one beam toward one or more gateways of a set of ground gateways that are configured to provide connectivity to a core network.

In yet another variant, the formed at least one beam originates from one of the apertures that are placed at an angle with respect to the given aperture.

In a third aspect, a system for providing broadband access is disclosed. In one embodiment, this system includes a plurality of gateways, each of the gateways being coupled to a core network; one or more user terminals; and an unmanned aerial vehicle (UAV). The UAV includes a first antenna system configured to form at least one first beam towards the one or more user terminals; a second antenna system configured to form at least one second beam toward the one or more gateways; a first set of radio transceivers and modems configured to transmit and receive a first plurality of signals to/from the one or more user terminals; a second set of radio transceivers and modems configured to transmit and receive a second plurality of signals to/from the one or more gateways; and a router/processor sub-system configured to route packets between the one or more user terminals and at least one of the plurality of gateways and to manage the at least one first and at least one second beams.

In one variant, the system collectively comprises a beam network, the beam network having a frequency reuse of at least three such that a given beam is assigned a given frequency such that adjacently located beams to the given beam do not share the given frequency.

In yet another variant, the frequency reuse reduces interference between adjacent beams thereby increasing a signal to noise plus interference ratio (SINR) and an achieved data rate.

In yet another variant, the gateways include a first gateway disposed at a first location of a UAV coverage area and a second gateway disposed at a second location of the UAV coverage area, the first and second locations being disposed at opposite ends of the UAV coverage area thereby providing gateway diversity for the system.

In yet another variant, the second gateway provides connectivity for the UAV to the core network when the first gateway is blocked from providing connectivity to the UAV during UAV maneuvering.

In yet another variant, the router/processor sub-system of the UAV is configured to: measure at least two signal to interference plus noise ratios (SINRs) from a received signal on a primary beam associated with a primary gateway and at least one other candidate beam; compare the at least two SINRs associated with the primary beam and the at least one other candidate beam; and determine when the primary beam should be switched to the at least one other candidate beam based at least in part on the comparison.

In yet another variant, the at least one other candidate beam comprises an inactive beam.

In yet another variant, the UAV further includes a power management subsystem that is configured to manage power consumption for the UAV based at least in part on measured atmospheric conditions.

In a fourth aspect, systems and methods for switching the UAV beams toward the user terminals and gateways as the UAV moves in its orbit are disclosed.

In a fifth aspect, systems and methods for routing traffic from user terminals to the internet via multiple gateways are disclosed.

In a sixth aspect, systems and methods for managing power control so as to minimize UAV power usage are disclosed.

In a seventh aspect, systems and methods for terminal antenna and gateway antenna beam steering towards a UAV are disclosed.

In an eighth aspect, systems and methods for providing a phased array approach to UAV beam forming are disclosed.

These and other aspects shall become apparent when considered in light of the disclosure provided herein.

BRIEF DESCRIPTION OF THE DRAWINGS

In the following figures, similar components are identified using the same reference label. Multiple instances of the same component in a figure are distinguished by inserting a dash after the reference label and adding a second reference label.

FIG. 1.1 is a graphical depiction of one exemplary beam network design configured to serve user terminals.

FIG. 1.2 is a graphical depiction of one exemplary beam network design configured to connect to gateways.

FIG. 2.1 is a graphical depiction of one exemplary unmanned aerial vehicle (UAV) antenna fixture for forming beams to user terminals and gateways.

FIG. 2.2 is a graphical depiction of one exemplary unmanned aerial vehicle (UAV) antenna sub-aperture for forming beams to user terminals and gateways.

FIG. 3 is a high level representation of one exemplary hardware architecture of one exemplary unmanned aerial vehicle (UAV), useful in conjunction with the various aspects described herein.

FIG. 4 is a high level block diagram of an unmanned aerial vehicle (UAV), routing data traffic to a core network via multiple gateways.

FIG. 5 is a logical representation of exemplary electronic beam forming circuitry.

All Figures © Copyright 2014 Ubiqomm, LLC. All rights reserved.

DETAILED DESCRIPTION

Reference is now made to the drawings, wherein like numerals refer to like parts throughout.

As used herein, the term "unmanned aerial vehicle" and "UAV" are used interchangeably and refer to any type of aerial vehicle that is intended to operate without an onboard human pilot. Examples, of these unmanned aerial vehicles or UAVs include, without limitation, drones, robocopters, balloons, blimps, airships, etc. These UAVs may include propulsion systems, fuel systems, and onboard navigational and control systems. In one exemplary embodiment, the UAV includes a fixed wing fuselage in combination with a propulsion means (e.g., a propeller, jet propulsion, etc.). In alternative embodiments, the UAV comprises a so-called robocopter, propelled by, for example, one or more rotors. The UAV may carry fuel onboard or may function using alternative energy sources that do not necessarily need to be carried onboard such as, for example, solar energy.

Exemplary UAV Beam Network and Beam Switching Mechanism—

In one embodiment, an unmanned aerial vehicle (UAV) provides broadband access to user terminals in an area of radius as large as 300 km. As will be discussed next, two (2) different UAV antenna systems are needed: (i) a first antenna system to provide coverage to user terminals which are referred to generally herein as "UAV user terminal antenna systems", and (ii) a second antenna system to provide coverage to gateways which are referred to generally herein as "UAV gateway antenna systems". In at least certain deployment scenarios, the gateways may be located farther from the UAV coverage area compared to the user terminals because the wireline connectivity to the gateway may not be available close to the UAV.

FIG. 1.1 illustrates one possible beam network design configured to serve user terminals. As shown, the beam network 100 has a frequency reuse of three (3) among the beams, i.e. the available spectrum is divided into three bands of F1, F2, and F3 and each beam is assigned one of the three frequency bands in such a way that no two adjacent beams use the same frequency. The dashed circles 110 depict the beams that cover each hexagonal area 120. The hexagons 120 are shown to help visualize the contiguous coverage area, however the actual beam footprints overlap (as shown by the dashed circles). The three dashed circle types correspond to the three frequency bands. Frequency reuse reduces interference from adjacent beams and helps increase signal to noise plus interference ratio (SINR) and the achieved data rate.

While the illustrated embodiment depicts a beam network that comprises thirty seven (37) beams arranged according to a frequency reuse factor of three (3), artisans of ordinary skill will readily appreciate that a different number of beams and/or frequency reuse factors may be used to suit a variety of other network considerations (e.g., cost, coverage, network complexity, etc.). For example, such a choice in the number of beams and/or frequency reuse factors may be chosen so as to reduce the level of interference from adjacent beams while helping to increase SNIR and the achieved data rate.

As will be discussed below (see e.g., Exemplary Antenna Systems), there are generally two types of antenna systems used in UAVs. In so-called "fixed beam" systems, the beams are not actively adjusted/steered to compensate for UAV roll and other movements. In one exemplary embodiment of a fixed beam system, the network of beams should be designed so that the beams cover a wider area than the anticipated coverage area (e.g., where the user terminals are). The reason for the wider coverage area is that as the UAV rolls, the beams formed on the ground as shown in FIG. 1.1 will move on the ground. Therefore, the beams must cover a wider area so that as the beams move due to UAV roll/turn, the desired average area of user terminals will still be covered by beams. In so-called "active beam steering" systems, such as e.g., phased arrays, the UAV adjusts the beams so the beams stay fixed on the same location ("footprint") on the ground despite the movement of UAV.

As previously noted, for fixed beam systems, the beams will move with respect to any user terminals within the coverage area due to UAV movements (such as roll and turn). Generally, the approach to handle beam movements is to switch the user terminal from one beam to another as the beams move.

The hardware architecture 300 for UAV communications payload to handle this beam switching is shown in FIG. 3. The communications payload is an apparatus which comprises antenna sub-apertures 302, 314 configured to form beams toward gateways and user terminals, modems 306 configured to demodulate/modulate signals from/to user terminals, modems 310 configured to demodulate/modulate signals from/to gateways, a set of radio transceivers and power amplifiers 312, 304 that are configured to connect to the UAV gateway, and user terminal antenna sub-apertures 314, 302. A processor/router subsystem 308 is configured to, inter alia, provide the requisite broadband access between the user terminals and the gateways.

The user terminal radio sub-system is configured to demodulate and decode signals from the beam(s) to which the user terminal has been assigned (i.e., as used herein, the so-called "primary beam" or "primary set"). The beam(s) that are adjacent to the user terminal's primary beam are referred to as the "neighbor set beams" or "neighbor set" for the user terminal. The user terminal's radio sub-system will periodically tune to the frequency channels of the neighbor set beams and measure one or more signal to interference plus noise ratios (SINRs) corresponding to the preamble signals that the UAV communications payload has transmitted on those beams. In one embodiment, this periodic tuning will occur at regular (i.e., fixed) intervals. Alternatively, this tuning may occur at dynamic intervals (periodically or aperiodically). For example, in one embodiment, the frequency of time between periods of measurement for the neighbor set SINR(s) may increase as a function of signal quality. In other words, as the SINR(s) measurement for the neighbor set improves, the periodic tuning may occur more frequently in anticipation of a possible switch from the primary beam set to a different beam. Alternatively, the interval of periodic tuning may be adjusted as a function of UAV motion (e.g., as a result of the roll and pitch motions of the UAV).

In yet another alternative embodiment, the user terminal may also search one or more preambles of the neighbor set beams when the SINR of its primary set falls below a threshold. If the user terminal radio sub-system detects a beam in the neighbor set whose SINR (or other signal quality metric), is within a certain threshold of that of the user terminal's primary beam, then the user terminal may request that the UAV communications payload switch the user terminal to a different beam. In other cases, where the user terminal radio sub-system detects a beam in the neighbor set whose SINR (or other signal quality metric) is acceptable and where the user terminal's primary beam is unacceptable, then the user terminal may request that the UAV communications payload switch the user terminal to a different beam. Still other schemes for triggering user terminal switch-over will be made apparent to those of ordinary skill, given the contents of the present disclosure. Similarly, for clarity, FIG. 3 depicts all signaling from user terminals being received at the user terminal modems and processed by the router/processor sub-system 308; however, it is appreciated that various other configurations may be substituted with equal success by ones of ordinary skill in the related arts, the depicted embodiment being merely illustrative.

In some circumstances, the gateways may be as far as 300 km away from the center of the UAV's coverage area. Further complicating matters, exemplary UAV may be stationary or moving (e.g., according to a circular pattern, clover pattern, etc.) around the center of coverage. Moreover, the UAV may go through roll and pitch motions which could result in obstructing the view of any antennas installed under the UAV. For example, if a gateway is placed far from the UAV such that the elevation angle from the gateway toward the UAV is lower than the angle that the UAV will roll, then the UAV antenna may be blocked with respect to the specified gateway during the roll. Here, the elevation angle from a user terminal/gateway to the UAV is defined to be the angle between the line tangent to earth from the location of the user terminal/gateway and the line connecting the user terminal/gateway to the UAV position. One way to solve this blockage condition is to use a second gateway 140, such as for example that shown in FIG. 1.2, which is far enough from the first gateway 130 that it would be visible during the UAV roll while the first gateway is blocked. Even though the UAV loses coverage to one gateway, the other gateway will be in the coverage of UAV antenna and can provide connectivity to the UAV. In other words, gateway blockage due to distance and UAV movement (e.g., banking) may be solved using gateway diversity. In some cases, gateway diversity may also be used to mitigate rain fade.

FIG. 1.2 shows an exemplary implementation of a beam network 100 configured to provide coverage to gateways 130, 140. FIG. 1.2 provides for up to N beams from the UAV toward gateway positions; however, as shown, only beams N and N/2 are transmitting, whereas the other beams (e.g., 1, 2, N/2+1, N−1, etc.) are not. The central circle 150 in the middle represents the coverage to user terminals (which was also illustrated in FIG. 1.1). The number of UAV beams needed to connect to gateways depends, in an exemplary implementation, on the frequency band used and the antenna gain needed. For example, a UAV may add more beams where there is significant interference, or alternatively reduce beams where there is very little traffic, etc.

Consider the exemplary scenario where the UAV turns a previously inactive beam "on" as the gateway passes through the beam's coverage area. As the UAV moves around in e.g., a circle, previously inactive beams may have better visibility to the gateway. As each UAV beam passes over the gateway, the UAV gateway beam management system switches the UAV gateway beam serving the gateway from one beam to another. In one aspect of the present disclosure, the UAV communication system considers one or more of a number of factors when determining to switch to another beam (e.g., signal strength, network considerations, geographic location, etc.). In one embodiment, even though only a few beams are actively transmitting to a gateway (as shown, beams N and N/2 are transmitting to gateway A 130 and B 140 respectively), the modems connected to the inactive beams receive and monitor signals sent by the gateway. FIG. 3 shows a high level hardware block diagram of the UAV beam switching scheme. During operation, the UAV communication modems 310 compare the SINR received from each gateway on all UAV gateway beams (both active and inactive beams); when an inactive beam has a received SINR that meets one or more prescribed criteria (e.g., is within a threshold of the active transmitting beam), then the UAV communication system may switch the transmitting beam to the new beam.

In some instances, the criterion/criteria (e.g., threshold) may be statically set or dynamically modified so as to optimize operation. For example, a threshold which is small may result in pre-emptive switching (and/or unnecessary "churn"), whereas a threshold which is large may provide slower switching which could degrade performance.

Where there are multiple gateways, then multiple UAV gateway beams may be transmitting simultaneously. For example, as shown in FIG. 1.2 two gateways 130, 140 (i.e., gateways A and B) are on opposite sides of the UAV coverage area. In this case, the UAV gateway beams that are transmitting toward the two gateways are not neighboring beams, and therefore do not cause interference to each other. While FIG. 1.2 reduces gateway beam interference through intelligent management of the spatial locations of the gateways, it is appreciated that other measures to prevent interference may be used. For example, gateway beams may be on different frequencies, use different time slots, and/or spreading codes, etc.

Exemplary Antenna Systems—

In one exemplary embodiment, the UAV comprises one or more UAV user terminal antenna systems and one or more UAV gateway antenna systems. The user terminal antenna system is configured to communicate with one or more user terminals whereas the gateway antenna systems are configured to communicate with one or more gateways.

Referring now to the UAV user terminal antenna system, the antenna fixture at the UAV is configured to cover a wide range of elevation angles toward the user terminals. As an illustration, FIG. 2.1 shows an exemplary implementation of a UAV antenna fixture 200 configured to serve user terminals. The multi-faceted antenna structure has multiple apertures 202 to cover a wide range of angles. Additionally, this antenna has multiple apertures which are designed to be conformal and aerodynamic. The antenna fixture 200 of FIG. 2.1 has seven (7) apertures/face. Each aperture covers a corresponding area (which may or may not overlap with other apertures). Each aperture comprises one or more smaller sub-apertures 204 shown as rectangles. Each sub-aperture element 204 creates one beam. The antenna fixture 200 is designed such that it is flat in the middle and tapers down toward the surface of the UAV at an inclination angle so that the antenna sub-apertures placed on the antenna fixture provide coverage to different areas. In one exemplary embodiment, the antenna may be installed under the UAV however it is appreciated that other implementations may place antennas at other locations so as to accommodate other uses.

The aperture 202 in the center, (as shown, numbered 7), covers locations closest to the UAV. Apertures 1 through 6 provide coverage to locations at the edge of the coverage. Antenna apertures 1 through 6 are placed at an angle with respect to aperture 7 in order to cover farther distances. As previously described, apertures 1 through 7 each comprise antenna sub-apertures and each of these sub-apertures creates a different beam on the ground. For example, in order to form the thirty-seven (37) beams of FIG. 1.1, the antenna fixture of FIG. 2.1 would need thirty-seven (37) sub-apertures each creating one beam, distributed among the seven (7) different faces, such that the sub-apertures generate the desired coverage area.

Referring now to the UAV gateway antenna system, the gateway may be placed much farther from the center of coverage area than the user terminals, therefore in one exemplary embodiment, the UAV antenna fixture serving the gateways would typically need to point its beams at lower elevation angles toward the gateway. In one implementation, the shape of the antenna fixture for gateways is the same as that of the UAV user terminal antenna fixture 200 (shown in FIG. 2.1); however, in order to provide the aforementioned lower elevation angles toward the gateway, the UAV antenna fixture for the gateway will need N sub-apertures placed around the circumference of the fixture tilted down with respect to the chord of the wing to cover father distances from the UAV where the gateways may be. In one such implementation, the N sub-apertures provide 360° of coverage in azimuth, directed at substantially a 45° angle of elevation.

Since the gateway may be in a wide area with a wide range of different elevation angles with respect to the UAV, the UAV gateway antenna system may be required to support a significant coverage area. Consider the following implementation where the gateways may be anywhere between 5° to 50° of elevation with respect to the UAV. The sub-aperture beams must cover an elevation angle range of 45° (i.e., 50°-5°), but the typical beamwidth of each antenna sub-aperture is only 12°. Under such a system, the UAV gateway antenna system includes four (4) beams each of beamwidth 12° to cover a radial angular region of 45°. However, the exemplary antenna fixture design (similar to that of FIG. 2.1) only has one sub-aperture antenna to cover the 45° radial angular range. Accordingly, in one such variant, the antenna subsystem creates four (4) fixed beams using beam forming techniques with the sub-aperture antenna unit. In other words, the beam forming can be performed in only one direction along the radial axis. The four (4) beams can be fixed beams and the UAV communications payload will choose one of the four (4) fixed beams for communications.

Referring now to FIG. 2.2, an alternative embodiment of a UAV gateway antenna system sub-aperture 250 is shown and described in detail. In one exemplary embodiment, the sub-aperture comprises antenna elements 252 spaced by a half wavelength along the length of the sub-aperture as shown in FIG. 2.2 where K antenna elements are shown. The K antennas elements 252 of the sub-aperture 250 shown in FIG. 2.2 may be phased using four (4) different set of K phases applied to the K elements. Each set of K phases will create a different beam pointing to one of four (4) different possible beam positions spaced at, in one exemplary embodiment, 12° spacings. The software in the modem sub-system of the UAV communications payload will choose one of the four (4) possible beams and instruct the sub-aperture circuitry to turn the corresponding beam on by using the appropriate set of eight (8) phases from among the four (4) sets.

While the foregoing discussion contemplates two different antenna fixtures (i.e., one to form beams toward the user terminals, and the other to form beams toward the gateways), it is appreciated that various other configurations will be made readily apparent to those of ordinary skill in the related arts, given the contents of the present disclosure. For example, various ones of the foregoing components and/or functions may be combined into a single fixture, or alternatively may be distributed across a greater number of fixtures.

Exemplary Scheme for Power Control to Minimize UAV Power Usage—

The power amplifier (PA) power of the UAV gateway and user terminals transmitters are, in an exemplary configuration) configured to compensate for rain/atmospheric fade. In one exemplary embodiment, weather conditions will be provided to the UAV via weather data transmissions from the gateway(s). Alternatively, the weather conditions may be determined by the UAV itself. It is appreciated that rain fade conditions may also be determined by the UAV based on direct signal measurement, however alternative implementations may consider information from other sources. For instance, the UAV can include a pulse-Doppler radar subsystem (not shown) that provides information regarding rain/atmospheric fade to the processor/routing subsystem (308. FIG. 3) in order for the PA of the UAV gateway and user terminal transmitters to control power to individual ones of the transmitted beams. Those of ordinary skill in the related arts will appreciate that in clear sky conditions, the PA power can be reduced by as much as 10 dB or more depending on the frequency band. In one exemplary embodiment, the UAV communications payload system incorporates dynamic power control based on measured received SINR, other quality measurements, and/or other network considerations. For instance, under clear sky conditions the UAV can be expected to have an optimal SINR based on calibration and measurements. As SINR is reduced due to e.g., rain fade, then the communications payload system will increase the transmit power toward the user terminals or gateways that are experiencing rain fade. Typically, only part of the UAV's coverage area may be impacted by rain fade. Therefore, the UAV can selectively increase power on the specific UAV user terminal beams that are in rain conditions to optimize its total power consumption without adversely affecting coverage. By intelligently managing power consumption, the average power usage of the UAV communications payload will be significantly less than the peak power usage (i.e., only where all beams are in rain fade will the UAV require its peak consumption).

Exemplary UAV Modem and Beam Switching Apparatus—

As discussed previously herein, FIG. 3 shows the high level hardware block diagram of an exemplary configuration of a radio system 300 that communicates with the gateways and manages beam formation (e.g., switching beams toward gateways, etc.). In the illustrated embodiment, there are N possible UAV beams toward the gateways. Only one of the N beams will be transmitting to a specific gateway (as shown in FIG. 3). The remaining transmitters are off. As can be seen in FIG. 3, all of the receivers that are attached to the N UAV gateway antenna sub-apertures are on and monitoring received signals. In one embodiment, the UAV gateway modems can receive signals on their respective beams to measure a signal quality metric such as SINR. The modems send the measured SINRs to the processor unit subsystem 308. The processor subsystem 308 will compare the measured SINRs from different sub-apertures/beams and will, based on relative SINR values, determine if the primary UAV gateway beam should be switched to a different UAV gateway beam/antenna sub-aperture (or the "candidate beam"). In the present context, the term "UAV primary gateway beam" refers without limitation to the UAV gateway beam/antenna sub-aperture providing coverage to a gateway.

If a switch is necessary, then the processor configures the modems corresponding to the two beams (both the candidate beam, as well as the primary beam) to execute a switch, and informs the gateway as to the beam switching event, the new beam, and the time the beam will be switched. Once the beam toward a given gateway is switched, then the processor/router sub-system 308 can resume normal operation. As shown in FIG. 3, the processor/router sub-system 308 can route packets received from the modems 306 serving the user terminal beams to the modem 310 that is connected to the new UAV primary gateway beam.

Exemplary Terminal Antenna and Gateway Antenna Beam Steering Toward UAV—

At high frequencies such as 28 GHz and 47 GHz (e.g., as recommended by ITU for HAPS (High Altitude Platforms)), high user terminal and gateway antenna gains are needed to achieve high data rates in the presence of rain fade. In order to provide such high gain, the beamwidth of the antennas could be as low as a few degrees. Unfortunately, the angle subtended from the user terminal location to the circle around which the UAV cruises at altitude is much larger than such beamwidths of the user terminal antennas. Accordingly, in one exemplary embodiment of the present disclosure, the user terminal antenna steers its beam to track the movement of the UAV. Since a UAV may have a variety of different movement patterns, the beam steering should provide elevation angle as well as azimuth angle with respect to the UAV (i.e. in at least two axes).

Those of ordinary skill will appreciate that user terminals may use electronic beam forming in both elevation and azimuth axes, electronic beam steering in one axis and mechanical steering in the other axis, or mechanical beam steering in both axes. Various beam steering systems are associated with different cost considerations. For example, since the rate at which the user terminals must steer their beams may be rather low, mechanical beam steering may be feasible with a small motor. Other implementations which require faster steering, may be based on electrical beam forming, etc.

In some embodiments, beam steering may be done as a combination of multiple techniques. For example, a user terminal or gateway modem measures SINR, or some other signal quality measure, using, for example, the preambles preceding packets. An antenna steering mechanism makes small perturbations to the antenna beam position and measures SINR from these preambles. Using the measured SINRs at different beam perturbations, the beam steering algorithm chooses the best beam position from among the measured positions. The beam perturbation and adjustment process continuously adjusts the beam position. Other information such as GPS based position of the UAV, the heading of the UAV, and/or the UAV's roll/pitch measured using gyroscope/accelerometer, will be periodically sent to the user terminal and gateways and may also assist in steering the antenna beams.

Exemplary Phased Array Approach to UAV Beam Forming—

In one exemplary embodiment, the antenna fixture 200 of FIG. 2.1, requires one sub-aperture 204 per beam, and creates a fixed beam forming system where the beams are not actively steered. The main advantage of fixed beam forming scheme is its simplicity from a hardware and software perspective. For example, and referring now to FIG. 5, the baseband circuitry 500 for forming M beams toward M different terminals is illustrated. The baseband circuitry of FIG. 5 uses a phased array approach to dynamically form multiple beams toward M different terminals. Signals to be transmitted to the M different terminals each may come from a different modem. N antenna elements are used to form beams toward M terminals. The beam toward the terminal labeled j is formed by multiplying the signal destined to user j by N coefficient $C_{j1}, \ldots C_{jN}$, and sending results to the N antenna elements. The coefficients $C_{j1}, \ldots C_{jN}$ determine the shape of the beam that is formed toward the j-th terminal. To form all M beams, the coefficients that are sent to each antenna element corresponding to different terminals are summed, up-converted, amplified, and applied to the corresponding antenna element as shown in FIG. 5. Other methods for implementing a phased array approach would be readily understood by one of ordinary skill, given the contents of the present disclosure.

Exemplary Inter-Gateway Traffic Routing with Multiple Gateways—

FIG. 4 shows a block diagram of the system 400 that routes traffic from the UAV (via the communications payload 402) to the gateway(s) 404 and vice versa. The network comprises a number of gateways 404 that communicate with the UAV Communications Payload (UCP). The gateways are connected via a wireline or microwave backhaul to a Core Network Element (CNE) 406. The CNE is a router that connects the UAV network with the rest of the internet 408. The CNE has a pool of IP addresses (typically an IP subnet) from which it can allocate IP addresses for individual user terminals. The CNE routes all data traffic to and from the UAV network and the internet.

As the UAV moves, the signal quality of the UAV radio links to the gateways will change due to UAV roll and movements and/or due to rain fade, atmospheric effects, etc. Generally, the network deployment is configured so as to ensure that at least one gateway will be in radio contact with the UAV at all times. The gateways maintain IP tunnels with the CNE and also periodically notifies the CNE of the quality of their link with the UAV.

Data arriving from a user terminal at the UCP 402 will be distributed across all the gateways 404 associated with the user's coverage. The gateways in turn send the IP packets on to the CNE 406 via the backhaul and IP tunnels. For data coming from the internet for the pool of IP addresses assigned to UAV network, the CNE uses multi-path routing techniques to distribute the IP packets across the different gateways. The multi-path IP routing will take into account signal strength of each gateway corresponding to a respective UAV and accordingly distribute the data so as to ensure delivery.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

What is claimed is:

1. A system for providing broadband access, comprising:
a plurality of gateways, each of the gateways being coupled to a core network;
one or more user terminals; and
an unmanned aerial vehicle (UAV), the UAV comprising:
a first antenna system configured to form at least one first beam towards the one or more user terminals;
a second antenna system configured to form at least one second beam toward the one or more gateways;
a first set of radio transceivers and modems configured to transmit and receive a first plurality of signals to/from the one or more user terminals;
a second set of radio transceivers and modems configured to transmit and receive a second plurality of signals to/from the one or more gateways; and
a router/processor sub-system configured to route packets between the one or more user terminals and at least one of the plurality of gateways and to manage the at least one first and at least one second beams, where the router/processor sub-system is further configured to:
determine at least one blockage condition that affects transmission or reception of the second plurality of signals to/from the one or more gateways; and
responsively switch the transmission or reception of the second plurality of signals to/from one or more diversity gateways.

2. The system of claim 1, wherein the system collectively comprises a beam network, the beam network having a frequency reuse of at least three such that a given beam is assigned a given frequency such that adjacently located beams to the given beam do not share the given frequency.

3. The system of claim 2, wherein the frequency reuse reduces interference between adjacent beams such that a signal to noise plus interference ratio (SINR) and an achieved data rate are increased.

4. The system of claim 1, wherein the plurality of gateways comprises a first gateway disposed at a first location of a UAV coverage area and a second gateway disposed at a second location of the UAV coverage area, the first and second locations being disposed at opposite ends of the UAV coverage area.

5. The system of claim 4, wherein the second gateway provides connectivity for the UAV to the core network when the first gateway is blocked from providing connectivity to the UAV during UAV maneuvering.

6. The system of claim 1, where the router/processor sub-system of the UAV is configured to:
measure at least two signal to interference plus noise ratios (SINRs) from a received signal on a primary beam associated with a primary gateway and at least one other candidate beam;
compare the at least two SINRs associated with the primary beam and the at least one other candidate beam; and
determine when the primary beam should be switched to the at least one other candidate beam based at least in part on the comparison.

7. The system of claim 6, wherein the at least one other candidate beam comprises an inactive beam.

8. The system of claim 1, wherein the UAV further comprises a power management subsystem, the power management subsystem configured to manage power.

9. An unmanned aerial vehicle (UAV) for use within a system for providing broadband access, the UAV comprising:
a first antenna system configured to form at least one first beam towards one or more user terminals;
a second antenna system configured to form at least one second beam toward one or more gateways;
a first set of radio transceivers and modems configured to transmit and receive a first plurality of signals to/from the one or more user terminals;
a second set of radio transceivers and modems configured to transmit and receive a second plurality of signals to/from the one or more gateways; and
a router/processor sub-system configured to route packets between the one or more user terminals and at least one of the plurality of gateways and to manage the at least one first and at least one second beams, where the router/processor sub-system is further configured to:
determine at least one blockage condition that affects transmission or reception of the second plurality of signals to/from the one or more gateways; and
responsively switch the transmission or reception of the second plurality of signals to/from one or more diversity gateways.

10. The UAV of claim 9, wherein the first antenna system is further configured for use within a beam network, the beam network having a frequency reuse of at least three such that a given beam is assigned a given frequency such that adjacently located beams to the given beam do not share the given frequency.

11. The UAV of claim 10, wherein the frequency reuse reduces interference between adjacent beams such that a signal to noise plus interference ratio (SINR) and an achieved data rate are increased.

12. The UAV of claim 9, wherein the second antenna system is further configured to form a first antenna beam toward a first gateway disposed at a first location of a UAV coverage area and a second antenna beam toward a second gateway disposed at a second location of the UAV coverage area, the first and second locations being disposed at opposite ends of the UAV coverage area.

13. The UAV of claim 9, where the router/processor sub-system is further configured to:
measure at least two signal to interference plus noise ratios (SINRs) from a received signal on a primary beam associated with a primary gateway and at least one other candidate beam;
compare the at least two SINRs associated with the primary beam and the at least one other candidate beam; and
determine when the primary beam should be switched to the at least one other candidate beam based at least in part on the comparison.

14. The UAV of claim 9, wherein the UAV further comprises a power management subsystem, the power management subsystem configured to manage power consumption for the UAV based at least in part on measured atmospheric conditions.

15. A method for providing broadband access, the method comprising:
- forming at least one first beam towards one or more user terminals via a first antenna system;
- forming at least one second beam toward one or more gateways via a second antenna system;
- transmitting and receiving a first plurality of signals to/from the one or more user terminals via a first set of radio transceivers and modems;
- transmitting and receiving a second plurality of signals to/from the one or more gateways via a second set of radio transceivers and modems; and
- routing packets between the one or more user terminals and at least one of the plurality of gateways and managing the at least one first and at least one second beams;
- determining at least one blockage condition that affects transmission or reception of the second plurality of signals to/from the one or more gateways; and
- responsively switching the transmission or reception of the second plurality of signals to/from one or more diversity gateways.

16. The method of claim 15, wherein the forming the at least one second beam toward one or more gateways comprises:
- forming a first beam toward a first gateway disposed at a first location of a UAV coverage area;
- forming a second beam toward a second gateway disposed at a second location of the UAV coverage area; and
- wherein the first and second locations being disposed at opposite ends of the UAV coverage area.

17. The method of claim 16, wherein the second gateway provides connectivity for the UAV to the core network when the first gateway is blocked from providing connectivity to the UAV during UAV maneuvering.

18. The method of claim 15, further comprising:
- measuring at least two signal to interference plus noise ratios (SINRs) from a received signal on a primary beam associated with a primary gateway and at least one other candidate beam;
- comparing the at least two SINRs associated with the primary beam and the at least one other candidate beam; and
- determining when the primary beam should be switched to the at least one other candidate beam based at least in part on the comparison.

19. The method of claim 15, further comprising managing power consumption for the UAV based at least in part on measured atmospheric conditions.

20. The method of claim 15, wherein the forming at least one first beam towards one or more user terminals via a first antenna system comprises a frequency reuse.

* * * * *

UNITED STATES PATENT AND TRADEMARK OFFICE
CERTIFICATE OF CORRECTION

| | | |
|---|---|---|
| PATENT NO. | : 9,614,608 B2 | Page 1 of 1 |
| APPLICATION NO. | : 14/486916 | |
| DATED | : April 4, 2017 | |
| INVENTOR(S) | : Ahmad Jalali et al. | |

It is certified that error appears in the above-identified patent and that said Letters Patent is hereby corrected as shown below:

In the Claims

Lines 6-8 currently reads (Claim 8 – Column 14):
"8. The system of claim 1, wherein the UAV further comprises a power management subsystem, the power management subsystem configured to manage power."

Should read:
-- 8. The system of claim 1, wherein the UAV further comprises a power management subsystem, the power management subsystem configured to manage power consumption for the UAV based at least in part on measured atmospheric conditions. --

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*